US012161591B2

(12) United States Patent
Qiu et al.

(10) Patent No.: US 12,161,591 B2
(45) Date of Patent: Dec. 10, 2024

(54) THERMAL COMFORT WHEELCHAIR BACKREST

(71) Applicant: THUJA INNOVATIONS INC., Victoria (CA)

(72) Inventors: Jintao Qiu, Shanghai (CN); Mingjie Cai, Victoria (CA); Robert Stanford Magyar, Victoria (CA)

( * ) Notice: Subject to any disclaimer, the term of this patent is extended or adjusted under 35 U.S.C. 154(b) by 76 days.

(21) Appl. No.: 17/799,896

(22) PCT Filed: Sep. 9, 2021

(86) PCT No.: PCT/CA2021/051244
§ 371 (c)(1),
(2) Date: Aug. 15, 2022

(87) PCT Pub. No.: WO2022/051851
PCT Pub. Date: Mar. 17, 2022

(65) Prior Publication Data
US 2023/0092084 A1 Mar. 23, 2023

(30) Foreign Application Priority Data
Sep. 10, 2020 (CA) ................................ CA 3092701

(51) Int. Cl.
*A61G 5/10* (2006.01)
*A47C 7/74* (2006.01)

(52) U.S. Cl.
CPC .............. *A61G 5/1048* (2016.11); *A47C 7/74* (2013.01); *A47C 7/742* (2013.01)

(58) Field of Classification Search
CPC ........ A61G 5/1048; A47C 7/74; A47C 7/742; A47C 4/02
USPC .............. 297/180.11, 230.1, 230.11, 230.12, 297/230.13, 230.14, 440.2
See application file for complete search history.

(56) References Cited

U.S. PATENT DOCUMENTS 4,175,297 A * 11/1979 Robbins ............. A61G 7/05776 297/180.11 X
4,335,725 A * 6/1982 Geldmacher ........... A61F 7/007 297/180.11 X
4,615,856 A * 10/1986 Silverman ........... B29C 33/3878 264/102
4,898,425 A * 2/1990 Mundy ................ A61G 5/1054 297/440.2
4,966,145 A * 10/1990 Kikumoto ............ A61G 5/1043 297/180.15 X
4,981,324 A * 1/1991 Law ......................... A47C 7/74 297/180.11 X (Continued)

FOREIGN PATENT DOCUMENTS

EP 1129647 A1 5/2001

*Primary Examiner* — Rodney B White

(57) ABSTRACT

A backrest for a wheelchair or other mobility device configured to provide user controllable cooling and heat to the wheelchair user's back. The cooling element includes a Peltier chip, heat sink and gel pad for user contact. The heating element includes heating wire interposed between the fabric cover and the compressible foam of the backrest cushioning. The cooling element and heating element both move with the movement of the fabric cover so as to provide good heat conduction contact without adversely affecting cushioning. The backrest includes a tillable mount.

17 Claims, 9 Drawing Sheets

(56) References Cited

U.S. PATENT DOCUMENTS 5,062,677 A * 11/1991 Jay ........................ A61G 5/122 297/440.2 X
5,102,195 A * 4/1992 Axelson ................. A61G 5/121 297/440.2 X
5,127,709 A * 7/1992 Rubinstein ............... A61G 5/10 297/440.2 X
5,211,446 A * 5/1993 Jay ....................... A61G 5/1054 297/440.2 X
5,407,248 A * 4/1995 Jay ........................... A61G 5/12 297/440.2 X
5,524,969 A * 6/1996 Harrison .................. A47C 7/42 297/440.2 X
5,524,971 A * 6/1996 Jay ........................... A47C 7/46 297/440.2 X
5,556,168 A * 9/1996 Dinsmoor, III ...... A61G 5/1067 297/440.2
5,561,875 A * 10/1996 Graebe .............. A61G 7/05715 297/180.13
5,848,824 A * 12/1998 Mocur ..................... A61G 5/10 297/440.2 X
6,085,369 A 11/2000 Feher
6,460,933 B1 * 10/2002 Bors .................... A61G 5/1054 297/440.2 X
6,474,743 B1 * 11/2002 Harker ................. A61G 5/1067 297/440.2 X
6,688,693 B2 * 2/2004 Christofferson ......... A61G 5/12 297/440.2 X
6,865,825 B2 * 3/2005 Bailey, Sr. ............... A43B 7/14 36/88
7,191,480 B2 * 3/2007 Romano .............. A47C 31/006 297/180.14 X
7,827,805 B2 9/2010 Comiskey et al.
7,857,394 B2 * 12/2010 Whelan .................. A61G 5/122 297/440.2
7,980,580 B2 * 7/2011 Loewenthal ......... A61G 5/1054 297/440.2 X
8,474,908 B2 * 7/2013 Petzel .................... B60N 2/646 297/284.3
8,567,863 B2 * 10/2013 Hetzel .................. A61G 5/1067 297/440.2 X
8,590,977 B2 * 11/2013 Bee ......................... F16B 2/065 297/440.2
8,632,129 B2 * 1/2014 Huttenhuis .............. A47C 7/42 297/440.2 X
8,979,196 B2 * 3/2015 Simpson .................. A61G 5/12 297/440.2 X
8,991,926 B2 * 3/2015 Johansson .............. A61G 5/122 297/440.2 X
9,033,416 B1 * 5/2015 Vanderhorst ............. A47C 7/46 297/230.11
10,278,511 B2 * 5/2019 Youngblood ........ A47C 21/044
10,925,784 B1 * 2/2021 Abuhamda ............ A61G 5/122
10,986,933 B2 * 4/2021 Youngblood .......... A47C 21/04
11,013,338 B2 * 5/2021 Youngblood ........ A47C 31/008
11,013,339 B2 * 5/2021 Youngblood ........ A47C 21/044
11,013,883 B2 * 5/2021 Youngblood ........ A61B 5/1103
11,248,153 B2 * 2/2022 Lalouette ............. A61G 5/1048
11,560,077 B2 * 1/2023 Staels .................. B60N 2/5621
11,602,611 B2 * 3/2023 Youngblood .......... G16H 20/70
11,744,382 B2 * 9/2023 Youngblood ........... F28D 1/035 5/421
11,812,859 B2 * 11/2023 Youngblood ............ A61B 5/01
11,896,132 B2 * 2/2024 Youngblood ........ A47C 21/048
2003/0030318 A1 * 2/2003 Christofferson ......... A47C 7/46 297/452.34
2003/0102706 A1 * 6/2003 Float .................... A61G 5/1067 297/440.2
2004/0000804 A1 * 1/2004 Groth ....................... A61G 5/12 297/440.2 X
2004/0066081 A1 * 4/2004 Dennon ................... A61G 5/10 297/440.2
2007/0085407 A1 * 4/2007 Melgarejo ........... A61G 5/1054 297/440.2
2007/0107440 A1 5/2007 Ito et al.
2008/0100101 A1 1/2008 Wolas
2008/0084095 A1 * 4/2008 Wolas ...................... B60N 2/24 297/180.11
2008/0157581 A1 * 7/2008 Whelan ................ A61G 5/1067 297/440.2
2009/0072105 A1 * 3/2009 Cramer .................... A47C 7/42 297/440.2
2012/0326482 A1 * 12/2012 Goeckel ................. A61G 5/122 297/440.2
2016/0029808 A1 * 2/2016 Youngblood ........... F25D 29/00 62/3.2
2018/0221242 A1 * 8/2018 Lee ........................ A61H 39/06
2021/0219737 A1 * 7/2021 Youngblood ........ A61B 5/4809
2021/0268226 A1 * 9/2021 Youngblood ........ A47C 21/046
2021/0386964 A1 * 12/2021 Youngblood ........ A47C 27/085
2024/0049889 A1 * 2/2024 Youngblood ........ A61B 5/4809

* cited by examiner

THERMAL COMFORT WHEELCHAIR BACKREST

CROSS REFERENCE TO RELATED APPLICATIONS

This application claims the benefit of Canadian Patent Application No. 3,092,701, filed 10 Sep. 2020, and titled Thermal Comfort Wheelchair Backrest.

FIELD OF THE INVENTION

The present invention relates to the field of mobility devices with user seats, such as wheelchairs, mobility scooters etc.

BACKGROUND OF THE INVENTION

Being in a wheelchair for an extended period of time can be taxing on the wheelchair user's body in several ways. One issue is that the user generally requires the support of a backrest which adversely affects the dissipation of heat from a person's back. In warmer climates and/or seasons, overheating of the user's back is a common issue, which may result in accumulation of sweat and irritation, and undesirable general overheating of the user.

Wheelchair users have adopted various approaches for self cooling, including: using a portable fan and water spray in order to imitate sweat; using wet towels for the same purpose; wearing special clothing (e.g., a vest with compartments for ice); etc. Wheelchair athletes are sometimes cooled using water hoses.

Products for cooling a wheelchair user's back include a vented pad hat includes a fan and battery, and that in use is interposed between wheelchair backrest and the user's back so as to provide a flow of air over the user's back.

SUMMARY OF THE INVENTION

In one aspect, the present invention provides a thermal comfort wheelchair backrest that improves user's comfort level in a hot/cold environment by using smart cooling/heating elements embedded in the backrest.

In another aspect, the invention provides backrest for a mobility device, the backrest including: a backboard having a front side and a rear side; a resiliently compressible cushioning having a cushioning surface, and overlying and affixed to the backboard front side, whereby, responsive to user pressure, the cushioning compresses and the cushioning moves rearward, and, responsive to a reduction in user pressure, the cushioning expands and the cushioning surface moves frontward; a heating element at the cushioning surface; and a cooling assembly having a cooling element at the cushioning surface; wherein, in use the heating element and cooling element move rearward and frontward with the rearward and frontward movement of cushioning surface.

The backboard may have a cooling opening therethrough; the cooling element may be a heat conduction pad; the cooling assembly may include a Peltier chip bonded to the heat conduction pad; a heat sink abutting the Peltier chip; and a floating mount for the Peltier chip and heat sink; wherein, in use, the Peltier chip moves with the heat conduction pad responsive to user pressure, within the cooling opening, and the heat sink dissipates heat at the backboard rear side.

The heat conduction pad may contain a liquid or gel. The heat conduction pad may contain a liquid silicone gel.

The floating mount may include a pivot mount affixed to the backboard.

The backrest may include: a fan; and a fan air flow path that includes the heat sink, wherein in use a fan generated flow of air passes over the heat sink. The heat sink may include fins, and the fan generated flow of air may pass over the fins.

The cushioning may include compressible foam and a fabric cover bonded to the compressible foam; and the heating element may include a heating wire interposed between the foam and the fabric cover.

The backrest may include: a processing unit connected to the heating element and the cooling element; a battery connected to the processing unit; and a user control connected to the processing unit, wherein, in use the processing unit directs electrical power from the battery to the heating element or the cooling element, responsive to user instructions from the user control.

At least one sensor may be connected to the processing unit, the at least one sensor selected from the group consisting of: pressure sensor, ambient temperature sensor, user back temperature sensor, heating temperature sensor, cooling temperature sensor, heat sink temperature sensor, processor/controller temperature sensor, current sensor and combinations of two or more of the foregoing.

The user control may be a remote control. The user instructions may include: high cooling, low cooling, off, low heating and high heating.

The backrest may include a wheelchair mount assembly for mounting the backrest to a wheelchair.

The wheelchair mount assembly may be configured for mounting the backrest to a wheelchair having two upward projecting backrest support tubes. The wheelchair mount assembly may include: a first tube mount, for mounting to a one of the upward projecting backrest support tubes; a second tube mount, for mounting to the other of the upward projecting backrest support tubes; a tilt shaft assembly having: a first tube mount connection and an opposed second tube mount connection, the tube mount connections configured to connect to the tube mounts in a manner that accommodates divergences from parallel as between the two upward projecting backrest support tubes; and a tilt shaft spanning the first tube mount connection and the second tube mount connection; and a tilt shaft receiving port mounted to the backboard, whereby in use, the backrest is tiltable about the tilt shaft.

In another aspect, the present invention provides a wheelchair including the backrest.

In another aspect, the present invention provides a backrest for a mobility device, the backrest including: a backboard having a front side, a rear side, and a cooling opening therethrough; a resiliently compressible cushioning having a cushioning surface, and overlying and affixed to the backboard front side, whereby, responsive to user pressure, the cushioning compresses and the cushioning moves rearward, and, responsive to a reduction in user pressure, the cushioning expands and the cushioning surface moves frontward; a heating element at the cushioning surface, wherein the cushioning comprises compressible foam and a fabric cover bonded to the compressible foam; and the heating element comprises a heating wire interposed between the foam and the fabric cover, whereby in use the heating element moves rearward and frontward with the rearward and frontward movement of the cushioning surface; a cooling assembly having: a heat conduction pad containing a liquid silicone gel, and located at the cushioning surface; a Peltier chip bonded to the heat conduction pad; a heat sink abutting the Peltier chip; and a floating mount for the Peltier chip and heat sink, comprising a pivot mount affixed to the backboard wherein, in use, the Peltier chip moves with the heat conduction pad responsive to user pressure, within the cooling opening, and the heat sink dissipates heat at the backboard rear side; a fan; and a fan air flow path that includes the heat sink, wherein in use a fan generated flow of air passes over the heat sink when the cooling element is operational; a processing unit connected to the heating element, the cooling element; a battery connected to the processing unit; and a user control connected to the processing unit, wherein, in use the processing unit directs electrical power from the battery to the heating element or the cooling element, responsive to user instructions from the user control.

The backrest may include at least one sensor connected to the processing unit, the at least one sensor selected from the group consisting of: pressure sensor, ambient temperature sensor, user back temperature sensor, heating temperature sensor, cooling temperature sensor, heat sink temperature sensor, processor/controller temperature sensor, current sensor and combinations of two or more of the foregoing.

DETAILED DESCRIPTION WITH REFERENCE TO THE DRAWINGS

Figure 1:
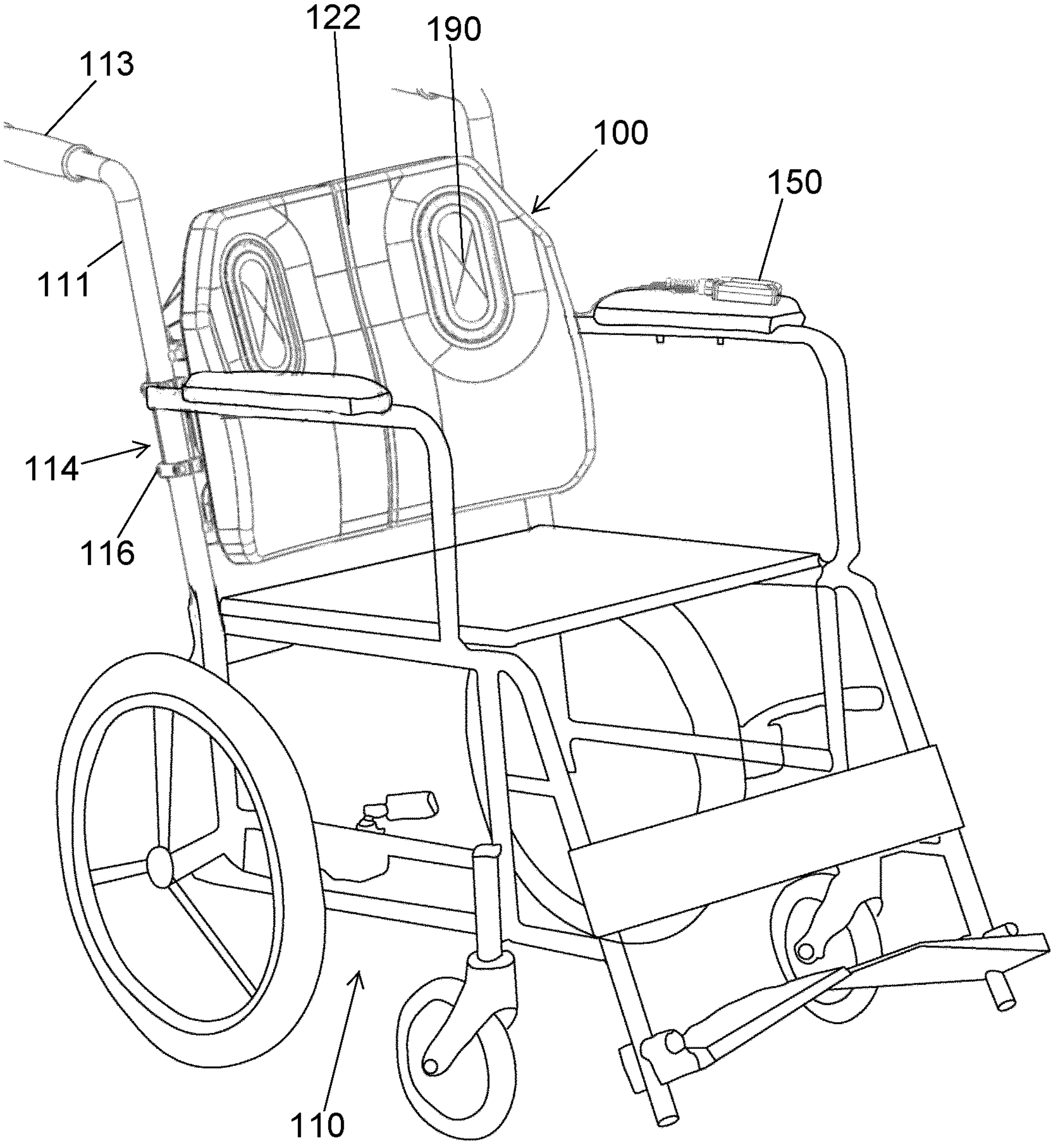
FIG. 1 is front perspective view of wheelchair with a backrest embodiment of the present invention.
Figure 2:
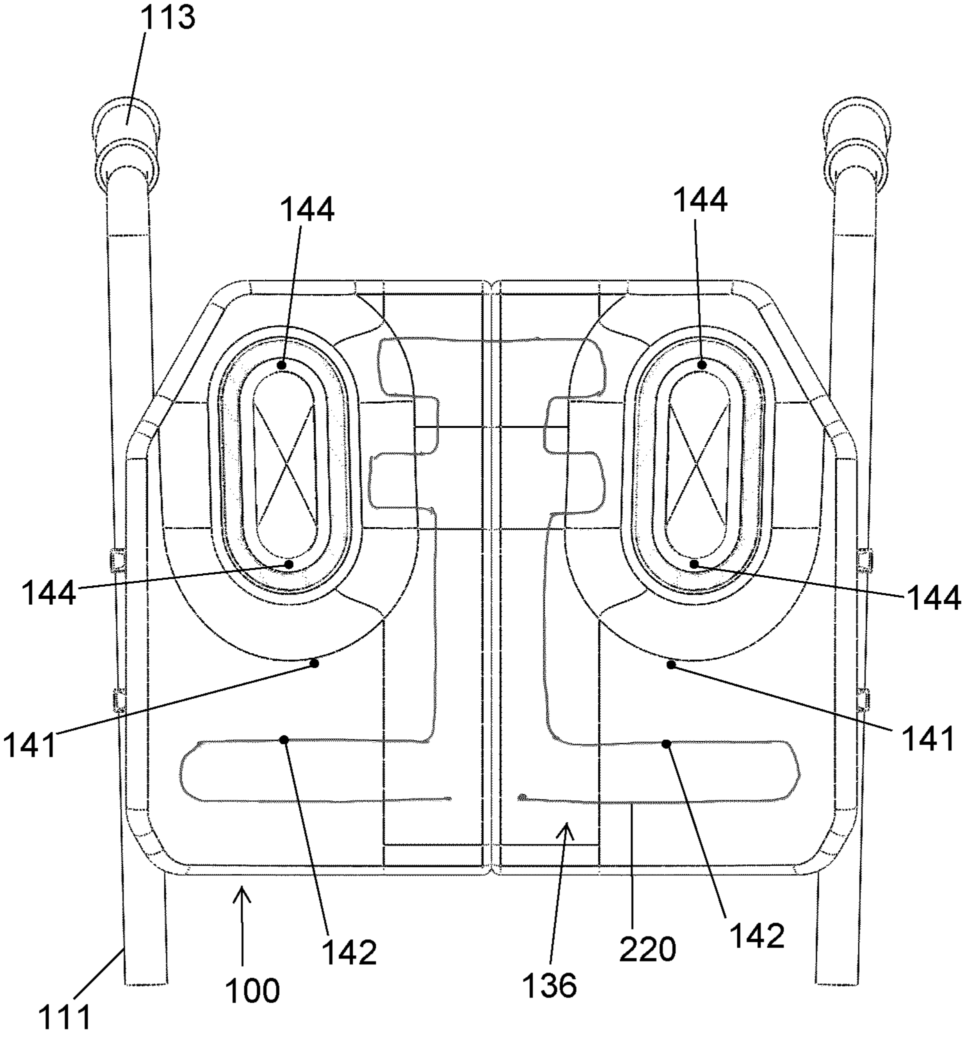
FIG. 2 is a front view of the cushioning and associated features of the backrest embodiment of FIG. 1, shown with portions of the wheelchair backrest support tubes.
Figure 3:
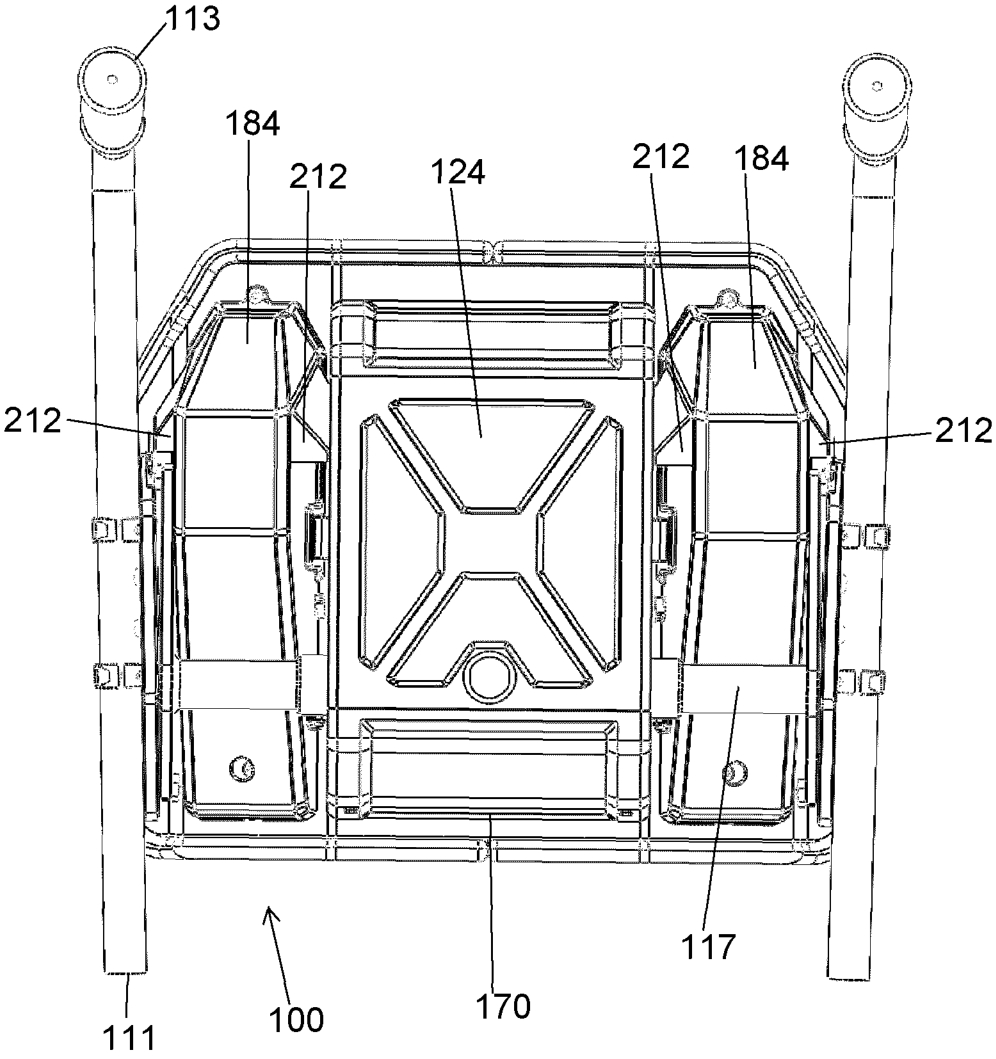
FIG. 3 is a rear view of the backrest embodiment of FIG. 1, shown with portions of the wheelchair backrest support tubes.
Figure 4:
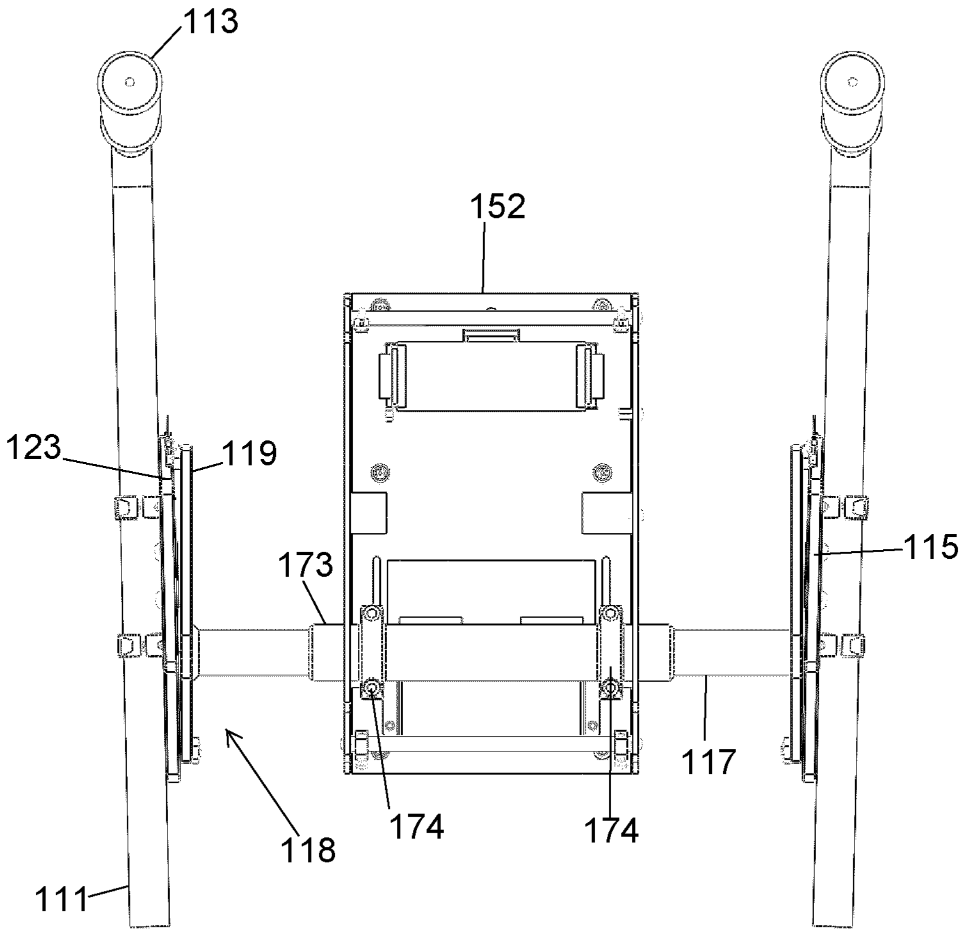
FIG. 4 is a rear view of the backrest embodiment of FIG. 1, shown with portions of the wheelchair backrest support tubes.
Figure 5:
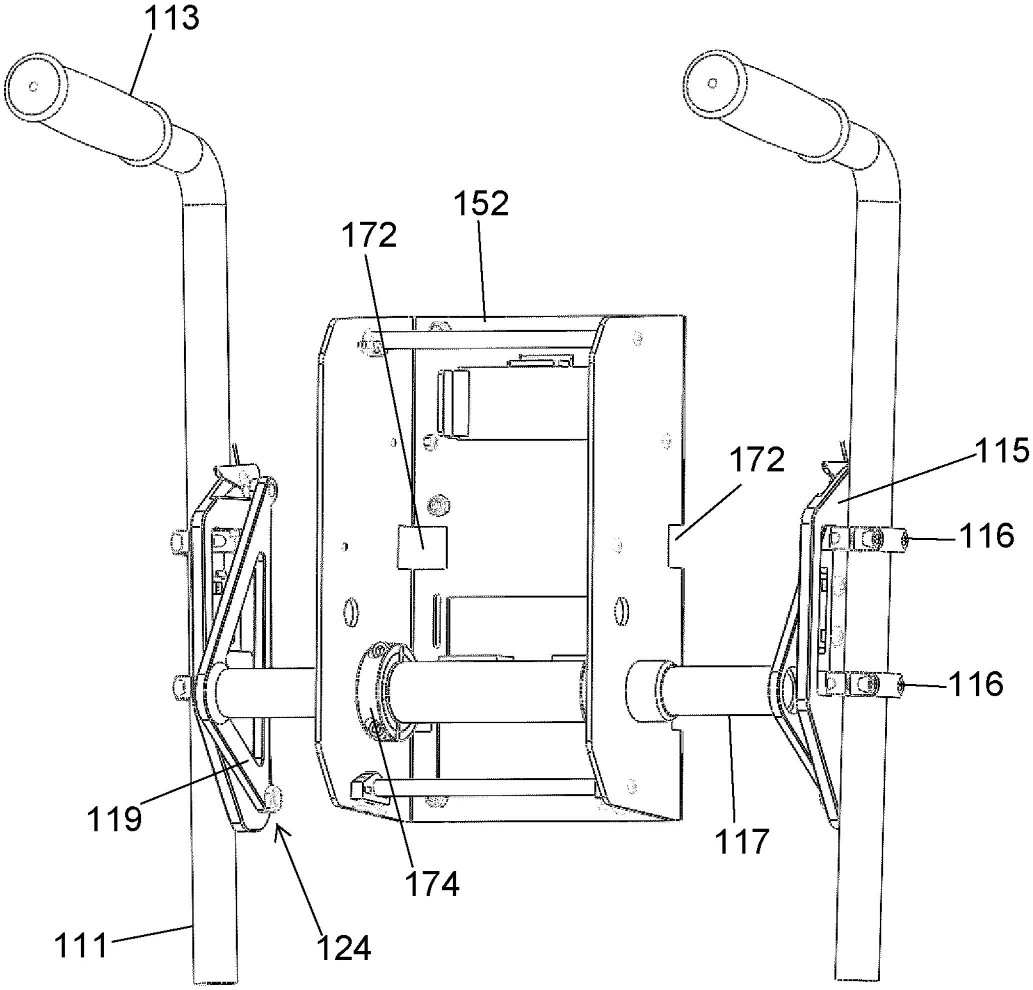
FIG. 5 is a right-side rear isolation perspective view showing the wheelchair mount assembly and housing bracket of the backrest embodiment of FIG. 1.
Figure 6:
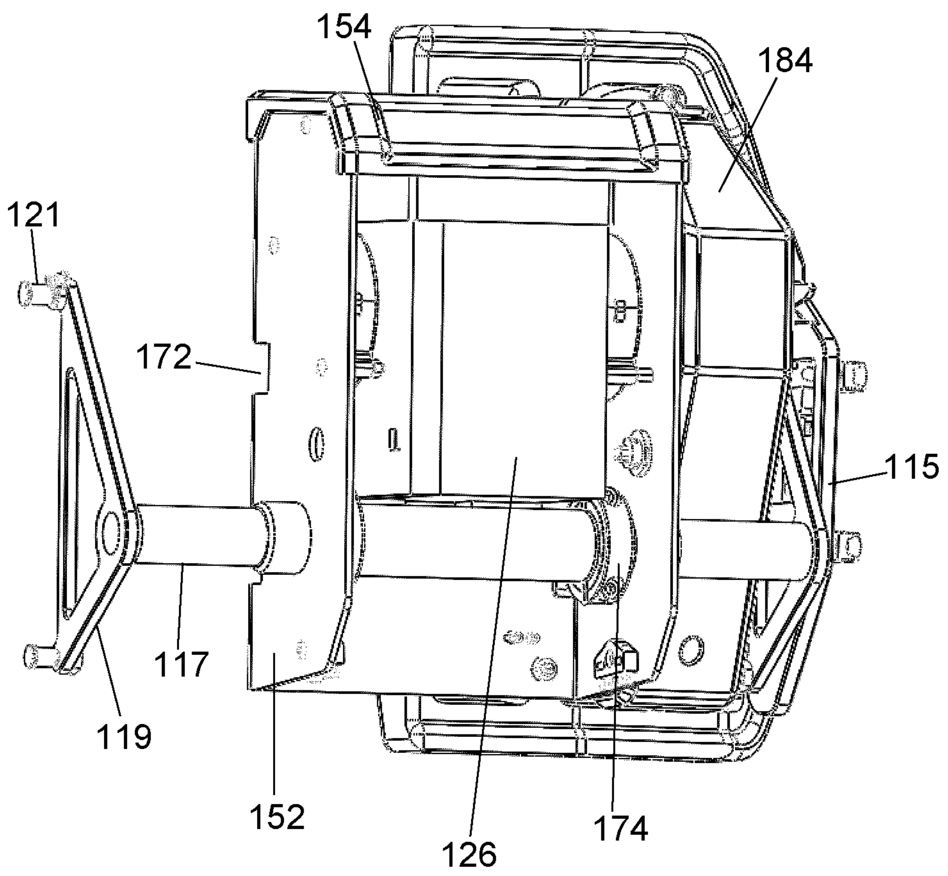
FIG. 6 is a left-side rear isolation perspective view showing part of the wheelchair mount assembly, housing bracket, part of the housing cover, and other components of the backrest embodiment of FIG. 1.
Figure 7:
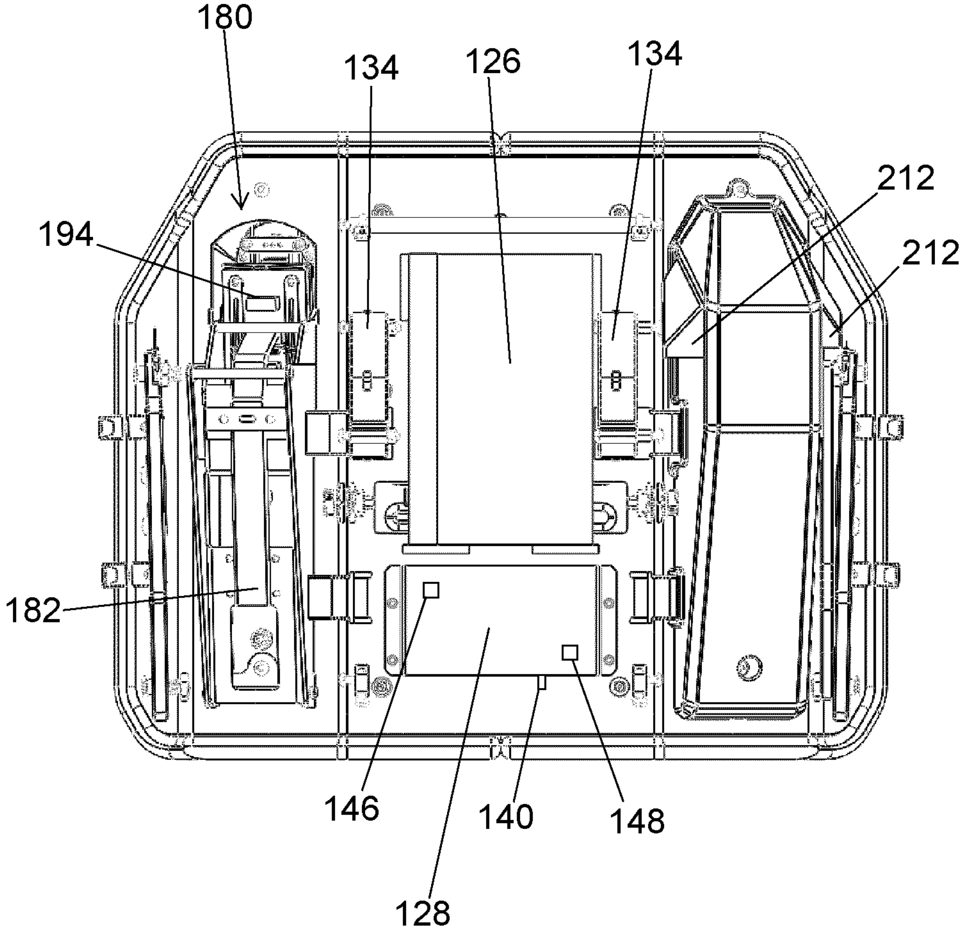
FIG. 7 is rear view of the backrest embodiment of FIG. 1, with the left cooling unit housing, the housing cover and the tilt shaft, not shown for clarity.
Figure 8:
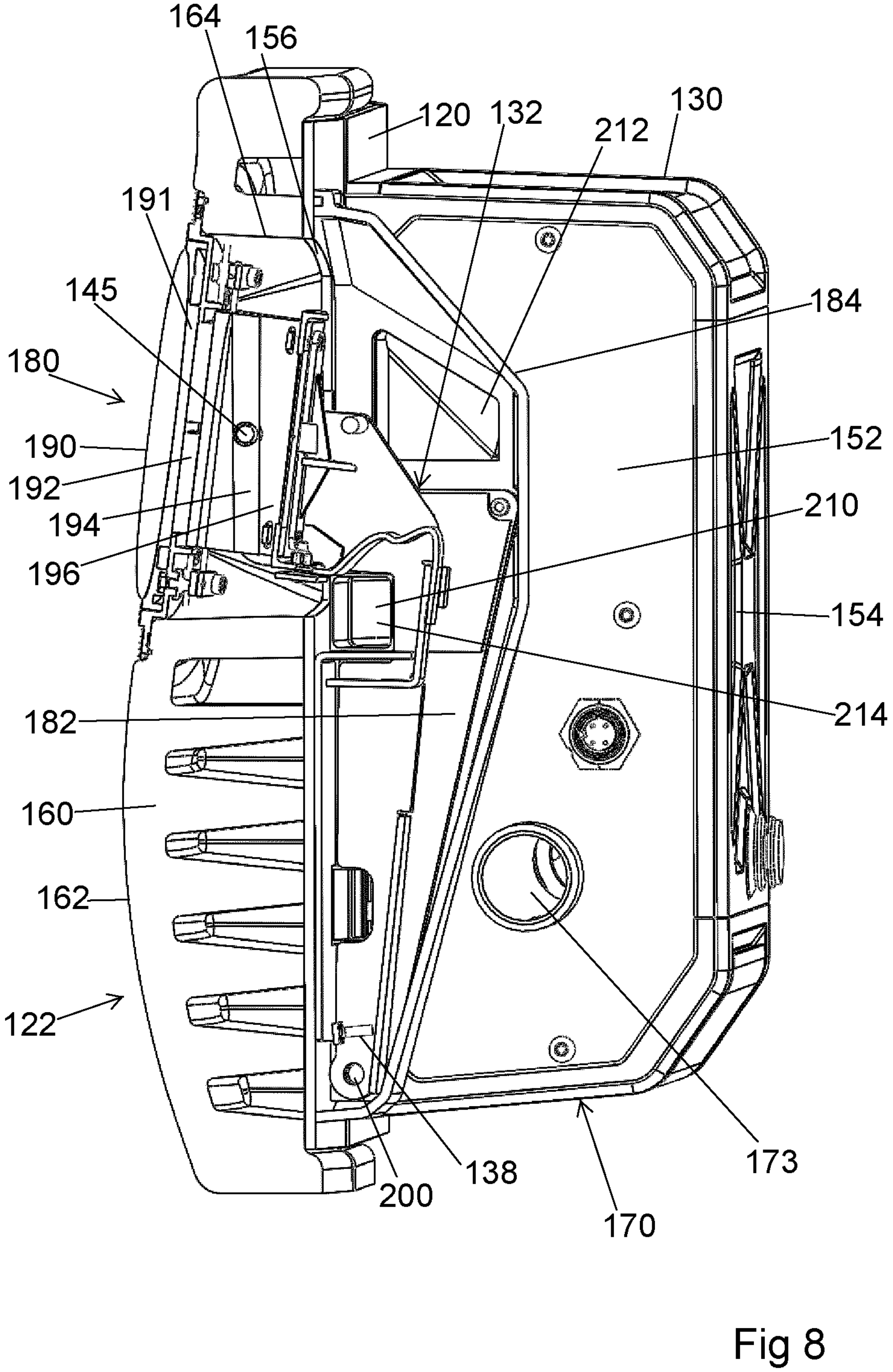
FIG. 8 is side sectional view of a cooling unit and associated features of the backrest embodiment of FIG. 1, with the cooling unit in a frontward position.
Figure 9:
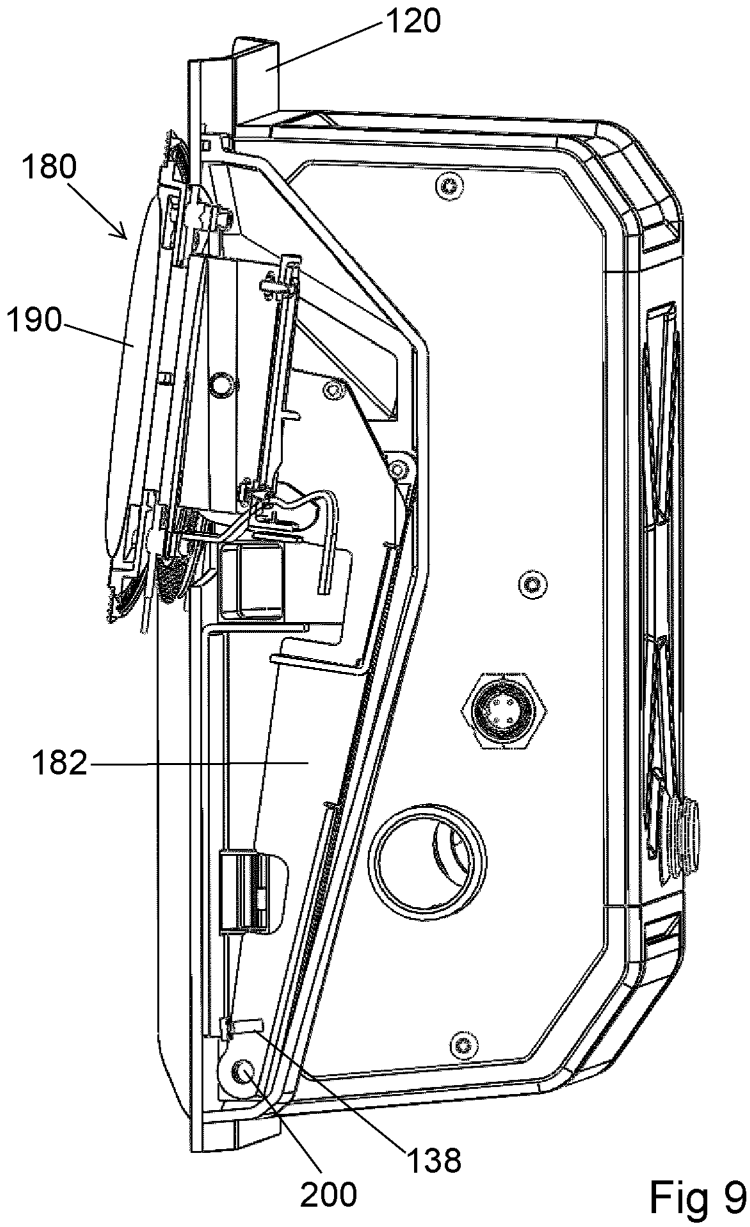
FIG. 9 is side sectional view of a cooling unit and associated features of the backrest embodiment of FIG. 1, with the cushioning not shown and with the cooling unit in a rearward position.

As shown in the drawings, embodiments of the present invention include a backrest 100 for use on a wheelchair 110 or other mobility device with a seat back.

The backrest 100 includes: a backboard 120, cushioning 122, wheelchair mount assembly 124, a battery 126, a processor/controller assembly 128, battery/processor housing 130, two cooling units 132, two fans 134, a heating assembly 136, pressure sensors 138, an ambient temperature sensor 140, user back temperature sensor 141, heating temperature sensors 142, cooling temperature sensors 144, heat sink temperature sensors 145, processor/controller temperature sensor 146, current sensors 148, and a user remote control 150.

The backboard 120 is the structural frame to which the other components of the backrest 100 are mounted. The backboard 120 includes a variety of suitable mounting features, including backboard cooling openings 156 for accommodating portions of the cooling modules 132 that extend therethrough. The backboard may be made of any suitable material, including steel, aluminum, composites, plastics or combinations of same. The backboard 120 may be provided in a range of sizes. Further, custom backboards may be provided, for example via 3D printing.

The cushioning 122 is located on the front of the backboard 120, and comprises foam padding 160 and a fabric cover 162. The foam padding 160 is preferably a closed-cell foam. Based on user requirements, a foam mould can be 3D printed using plastic material. Smooth-On FlexFoam-IT(™) 6 pillow-soft flexible foam or other expanding foam can be poured into the mould to create a customized foam configuration. The foam padding 160 is bonded to the backboard 120.

The fabric cover 162 overlies, and is bonded to, the foam padding 160. The fabric cover 162 may be made from any material having suitable durablity, cleanability and comfort (e.g., breathability; in some instances the user may be wearing only a thin shirt, or may have a bare back, when using the backrest 100). The fabric is preferably a Microclimatic Cover, for example like 3XD Spacer the 3D Spacer Fabric from Baltex(™).

The foam padding 160 and fabric cover 162 define cushioning cooling ports 164 aligned with the backboard cooling openings 156, for accommodating the portions of the cooling modules 132 that extend therethrough.

As indicated in the drawings, a wheelchair 110 conventionally has two upward projecting backrest support tubes 111 (that in unpowered wheelchairs terminate in handles 113). The wheelchair mount assembly 124 includes: two tube mounts 114; and a tilt shaft assembly 118. Each tube mount 114 comprising a side plate 115 and two spaced apart tube clamps 116. The tilt shaft assembly 118 comprises triangular frames 119 and a tilt shaft 117 extending between the triangular frames 119. Each triangular frame 119 has two extending pins 121 and each tube clamp 116 has two corresponding pin receptacles 123. As indicated in the drawings, the pins 121 and pin receptacles 123 are configured to accommodate a divergence from parallel between the backrest support tubes 111.

In the embodiment shown in the drawings, the battery 126 is supported by the backboard 120. The connections for the battery 126 are preferably configured so that the battery 126 may be charged in place. Desirably, the battery 126 is user removable to enable the user to swap batteries (e.g., replace a low battery with a fully charged battery), perform any required maintenance, and or replace a malfunctioning battery. The battery 126 could of course be located elsewhere on the wheelchair 110, for example under the seat. Alternatively, there could be one or more additional batteries, for example under the seat, either connected to the processor/controller assembly 128 to supplement/back up the battery 126, or merely carried to be available to swap out the battery 126. In the embodiment shown in the drawings, the battery 126 is a 12V>10 Ah LiFePO4 rechargeable battery, which is about 150×95×95 mm (or slightly larger), and is understood to provide 2-5 hours of usage with 30-60 W adaptive cooling power. Preferably, the battery 126 has embedded safety functions. Battery technology is rapidly evolving and other battery types may be as suitable or more suitable.

The processor/controller assembly 128 includes a CPU chip and electrical control switches, and is electrically connected to: the battery 126, the cooling assemblies 180, the fans 134, the heating assembly 136, the pressure sensors 138, the ambient temperature sensor 140, the heating temperature sensors 142, the cooling temperature sensors 144, the processor/controller temperature sensor 146, the current sensors 148, and the user remote control 150.

The battery/processor housing 130 comprises a housing bracket 152 attached to the backboard 120 and having projecting side walls; and a housing cover 154 attached to the projecting side walls and other peripheral top and bottom features of the housing bracket 152. The battery/processor housing 130 and protects the battery 126, the processor/controller assembly 128 and the fans 134 from water (i.e., rain, splashed water etc.). There is an air inlet 170 at the bottom of the housing cover 154, with a baffle (i.e., anti-splash guard) that impedes passage of water while permitting flow of air. On each side of the housing bracket 152 there is a fan outlet port 172.

The housing bracket 152 includes two tilt shaft openings 173 through which the tilt shaft 117 extends. Within the battery/processor housing 130, at each of the tilt shaft openings 173, a clamp-on shaft collar 174 is affixed to the tilt shaft 117. Each clamp-on shaft collar 174 provides a sealing and wear material (i.e., a bushing) for pivotal movement within the respective shaft opening 173, and an abutment against the adjacent interior wall of the battery/processor housing 130 so as to impede relative movement of the battery/processor housing 130 along the length of the tilt shaft 117. The battery/processor housing 130 is pivotable about the tilt shaft 117 which in use provides a desirably large backrest tilting range.

A one of the cooling units 132 is located on each side of the battery/processor housing 130. Each cooling unit 132 includes: a cooling assembly 180; a floating mount 182, and a cooling unit housing 184.

Each cooling assembly 180 includes: a heat conduction pad 190, cooling transfer plate 191, a Peltier module 192 and a heat sink 194.

The heat conduction pad 190 is a soft thermal transfer pad, preferably a liquid silicone gel pad. A protective material (preferably a thin PVC or other material that readily conducts heat and is UV resistant) is bonded to the front face of the heat conduction pad 190 (i.e., the face of the heat conduction pad 190 that in use is closest to the user's back). The rear face of the gel pad may be PVC or other suitable material, e.g., a polyester material. The periphery of the protective material of the heat conduction pad 190, is directly or indirectly attached to the fabric cover 162 material adjacent the respective cushioning cooling opening 164. The liquid silicone gel preferably has high heat conduction characteristics. Any non-toxic liquid or gel that has high heat conduction characteristics could be used to fill the gel pad.

In the embodiment illustrated in the drawings, the Peltier module comprises two Peltier chips, model CP40347 from CUI Devices'. Preferably, the Peltier module 192 itself and all related electrical circuits, are well protected by waterproof coatings (e.g., HumiSealR 1B73 conformal coatings).

The Peltier module 192 has a heat receiving side and a heat emitting side. The cooling transfer plate 191 is between the heat conduction pad 190 and the heat receiving side of the Peltier module 192. The heat conduction pad 190 is bonded to the cooling transfer plate 191, (in the embodiments shown in the drawings, with a durable double sided tape). The Peltier module 192 is relatively fragile, and the cooling transfer plate 191 and heat sink 124 together support and secure the Peltier module 192.

The heat sink 194 is integral to, or bonded for optimum heat conduction with, the heat emitting side of the Peltier module 192. The heat sink 194 includes projecting heat sink fins 196 for heat dissipation.

The floating mount 182 is pivotally mounted to the backboard 120 at pivot mount 200 at the lower/proximal end of the floating mount 182. The cooling assembly 180 is attached to the floating mount 182 at the upper/distal end of the floating mount 182. The floating mount 182 enables the cooling assembly 180 to move relative to the backboard 120 responsive to user pressure on the cushioning 122 and heat conduction pad 190. For example, when a user rests against the cushioning 122 and heat conduction pad 190, the foam padding 160 will compress and the heat conduction 190 will move rearward with the adjacent foam padding 160 and fabric cover 162. When the user ceases resting against the cushioning 122, or the user adjusts their position so as to apply less force to the cushioning 122, the foam padding 160 will expand and the heat conduction pad 190 will move frontward with the adjacent foam padding 160 and fabric cover 162. Essentially, the foam padding acts as a spring to ensure the heat conduction pad 190 moves with the user's body.

The cooling unit housing 184 is attached to the backboard 120 and protects the cooling assembly 180 and floating mount 182 from water (i.e., rain, splashed water etc.). There is a fan air inlet 210 at the side of each cooling unit housing 184 that is closest to the battery/processor housing 130. There is a cowled air vent 212 on each side of the cooling unit housing 184.

Each fan 134 has a fan outlet 214 that is sealingly mounted within the respective fan outlet port 172 and in alignment with the respective fan air inlet 210. In use, each fan 134: draws ambient air via the air inlet 170 and the interior of the battery/processor housing 130 (such that cooling air passes over the battery 126 and processor/controller assembly 128); and blows air back to atmosphere via the respective fan air inlet 210, the interior of the cooling unit housing 184 (such that cooling air passes over the heat sink fins 196) and the cowled air vent 212. The Delta Electronics fan model BFB0712HD, is an example of a suitable fan.

The heading assembly 136 includes at least one electrical circuit comprising heating wire 220 and the processor/controller assembly 128. The heating wire 220 is interposed between foam padding 160 and the fabric cover 162, and is held in place by the bonding between same. Alternatively, the heating wire 220 may be woven into the material of the fabric cover 162. The heating wire 220 is preferably carbon fibre heating wire with a silicone sheath, as such heating wire is very flexible and is understood to be safe for direct body contact even if the sheath is broken (thus reducing the risk of low-temperature burns or fire hazards).

A single heating wire circuit is illustrated in the drawings. To be clear, in some instances, it may be desirable to have a plurality of independently operable circuits, e.g., to provide rapid heating by activating all circuits initially and then selectively deactivating circuits as a desired user back temperature is achieved, to provide localized heating (e.g., to alleviate localized arthritic or other pain), etc.

In the embodiments shown in the drawings, each pressure sensor 138 is interposed between the backboard 120 and a respective floating mount 182 in the vicinity of the pivot mount 200. The pressure sensors 138 distinguish between an in-use situation (i.e., when the user is resting against the heat conduction pad 190 so as to cause a rearward displacement of cooling assembly 180) and a not-in-use situation (when, the user is not resting against the heat conduction pad 190 in a manner to cause rearward displacement of cooling assembly 180).

One or more heating temperature sensors 142 is located in the vicinity of the heating wire 220 to provide thermostatic control information for the heating wire 220, and to indicate any anomalous heat situations which may relate to a malfunction.

Cooling temperature sensors 144 are located in, or adjacent to, the heat conduction pad 190 to provide thermostatic control information for the cooling assemblies 180.

The processor/controller temperature sensor 146 is located in, on or adjacent to the processor/controller assembly 128 to provide thermostatic control information for cooling the processor/controller assembly 128 (i.e., by actuating one or both fans) and to indicate any anomalous heat situations which may relate to a malfunction.

Current sensors 148 are positioned at various locations and are intended to indicate electric faults, e.g., shorts.

The user remote control 150 has an interface (e.g., button (s), dial(s), a touch screen etc.), through which the user may select functional states, e.g., at the least, high cooling, low cooling, off, low heating and high heating. The user remote control 150 may be configured to enable the user to select functional states with finer distinctions than high and low, for example, temperature could be user specified by degrees or a range of degrees. In use, the user remote control 150 is preferably mounted to an armrest of the wheelchair. However, the user remote control 150 could be free of the wheelchair, enabling the wheelchair user, or a person assisting the wheelchair user, to locate the user remote control 150 as desired.

In use, the processor/controller assembly 128: receives user input from the user remote control 150; receives data, essentially continuously from the pressure sensors 138, ambient temperature sensor 140, user back temperature sensor 141, heating temperature sensors 142, cooling temperature sensors 144, heat sink temperature sensors 145, processor/controller temperature sensor 146, and current sensors 148; and uses the inputs and data to manage the performance of the cooling/heating elements to enhance user thermal comfort, for example by: for cooling, lowering the cooling contact temperature (i.e., the user experienced temperature at the heat conduction pad 190) when the ambient temperature is in the range of about 35° C. to about 40° C.; and, for heating, increasing the heading contact temperature ((i.e., the user experienced temperature in the vicinity of the heating wire 220) in the range of about 10° C. to 15C.

Backrest embodiments of the present invention may include occupation sensors that continuously or intermittently sense: backrest tilt condition; extent of user back contact with the backrest; and user force applied to the backrest.

Backrest embodiments of the present invention may include user-condition features, for example: sensors to monitor the user's health status, e.g., heart rate, blood pressure meter and blood oxygenation, and one or more pressure sensors to trigger alerts regarding correcting the users sitting position.

Backrest embodiments of the present invention may include communication and data collection features, e.g.: the backrest may be wirelessly connected to the Internet or personal computing device (e.g., smart phone) of the user or a caregiver; and information collected may be shared in a manner under the control of the user or caregiver The scope of the claims should not be limited by the preferred embodiments set forth in the examples, but should be given the broadest interpretation consistent with the description as a whole.

What is claimed is:

1. A backrest for a mobility device, the backrest comprising:

a backboard having a front side and a rear side;

a resiliently compressible cushioning having a cushioning surface, and overlying and affixed to the backboard front side, whereby, responsive to user pressure, the cushioning compresses and the cushioning moves rearward, and, responsive to a reduction in user pressure, the cushioning expands and the cushioning surface moves frontward;

a cooling assembly having a cooling element at the cushioning surface;

wherein, in use cooling element moves rearward and frontward with the rearward and frontward movement of cushioning surface;

wherein the backboard has a cooling opening therethrough;

the cooling element is a heat conduction pad; and the cooling assembly further comprises:

a Peltier chip bonded to the heat conduction pad;

a heat sink abutting the Peltier chip; and a floating mount for the Peltier chip and heat sink; and wherein, in use, the Peltier chip moves with the heat conduction pad responsive to user pressure, within the cooling opening, and the heat sink dissipates heat at the backboard rear side.

2. The backrest of claim 1, wherein the heat conduction pad contains a liquid or gel.

3. The backrest of claim 1, wherein the heat conduction pad contains a liquid silicone gel.

4. The backrest of claim 1, wherein the floating mount comprises a pivot mount affixed to the backboard.

5. The backrest of claim 1, further comprising: a fan; and a fan air flow path that includes the heat sink, wherein in use a fan generated flow of air passes over the heat sink.

6. The backrest of claim 5, wherein the heat sink includes fins, and the fan generated flow of air passes over the fins.

7. The backrest of claim 1, wherein:

the cushioning comprises compressible foam and a fabric cover bonded to the compressible foam; and the backrest further comprises a heating element at the cushioning surface, and the heating element comprises a heating wire interposed between the foam and the fabric cover.

8. The backrest of claim 7, further comprising:

a processing unit connected to the heating element and the cooling element;

a battery connected to the processing unit; and a user control connected to the processing unit, wherein, in use the processing unit directs electrical power from the battery to the heating element or the cooling element, responsive to user instructions from the user control.

9. The backrest of claim 8, further comprising at least one sensor connected to the processing unit, the at least one sensor selected from the group consisting of: pressure sensor, ambient temperature sensor, user back temperature sensor, heating temperature sensor, cooling temperature sensor, heat sink temperature sensor, processor/controller temperature sensor, current sensor and combinations of two or more of the foregoing.

10. The backrest of claim 8, wherein the user control is a remote control.

11. The backrest of claim 8, wherein the user instructions comprise: high cooling, low cooling, off, low heating and high heating.

12. The backrest of claim 1, further comprising a wheelchair mount assembly for mounting the backrest to a wheelchair.

13. The backrest of claim 12, wherein the wheelchair mount assembly is configured for mounting the backrest to a wheelchair having two upward projecting backrest support tubes.

14. The backrest of claim 13, wherein the wheelchair mount assembly comprises:

a first tube mount, for mounting to a one of the upward projecting backrest support tubes;

a second tube mount, for mounting to the other of the upward projecting backrest support tubes;

a tilt shaft assembly having:

a first tube mount connection and an opposed second tube mount connection, the tube mount connections configured to connect to the tube mounts in a manner that accommodates divergences from parallel as between the two upward projecting backrest support tubes; and a tilt shaft spanning the first tube mount connection and the second tube mount connection; and a tilt shaft receiving port mounted to the backboard, whereby in use, the backrest is tiltable about the tilt shaft.

15. A wheelchair comprising the backrest of claim 1.

16. A backrest for a mobility device, the backrest comprising:

a backboard having a front side, a rear side, and a cooling opening therethrough;

a resiliently compressible cushioning having a cushioning surface, and overlying and affixed to the backboard front side, whereby, responsive to user pressure, the cushioning compresses and the cushioning moves rearward, and, responsive to a reduction in user pressure, the cushioning expands and the cushioning surface moves frontward;

a heating element at the cushioning surface, wherein the cushioning comprises compressible foam and a fabric cover bonded to the compressible foam; and the heating element comprises a heating wire interposed between the foam and the fabric cover, whereby in use the heating element moves rearward and frontward with the rearward and frontward movement of the cushioning surface;

a cooling assembly having: a heat conduction pad containing a liquid silicone gel, and located at the cushioning surface; a Peltier chip bonded to the heat conduction pad; a heat sink abutting the Peltier chip; and a floating mount for the Peltier chip and heat sink, comprising a pivot mount affixed to the backboard wherein, in use, the Peltier chip moves with the heat conduction pad responsive to user pressure, within the cooling opening, and the heat sink dissipates heat at the backboard rear side;

a fan; and a fan air flow path that includes the heat sink, wherein in use a fan generated flow of air passes over the heat sink when the cooling element is operational;

a processing unit connected to the heating element, the cooling element;

a battery connected to the processing unit; and a user control connected to the processing unit, wherein, in use the processing unit directs electrical power from the battery to the heating element or the cooling element, responsive to user instructions from the user control.

17. The backrest of claim 16, further comprising at least one sensor connected to the processing unit, at least one sensor selected from the group consisting of: pressure sensor, ambient temperature sensor, user back temperature sensor, heating temperature sensor, cooling temperature sensor, heat sink temperature sensor, processor/controller temperature sensor, current sensor and combinations of two or more of the foregoing.

* * * * *